United States Patent
Zhang et al.

(10) Patent No.: US 12,242,152 B2
(45) Date of Patent: Mar. 4, 2025

(54) DISPLAY MODULE AND VEHICLE-MOUNTED DISPLAY MODULE

(71) Applicants: Hefei Xinsheng Optoelectronics Technology Co., Ltd., Anhui (CN); BOE Technology Group Co., Ltd., Beijing (CN)

(72) Inventors: Qiang Zhang, Beijing (CN); Haifeng Xu, Beijing (CN); Hui Dong, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 308 days.

(21) Appl. No.: 17/789,033

(22) PCT Filed: Sep. 1, 2021

(86) PCT No.: PCT/CN2021/115918
§ 371 (c)(1),
(2) Date: Jun. 24, 2022

(87) PCT Pub. No.: WO2022/083303
PCT Pub. Date: Apr. 28, 2022

(65) Prior Publication Data
US 2023/0039801 A1 Feb. 9, 2023

(30) Foreign Application Priority Data
Oct. 22, 2020 (CN) .......................... 202022392931.4

(51) Int. Cl.
*G02F 1/13357* (2006.01)
*G02F 1/1333* (2006.01)

(52) U.S. Cl.
CPC .. *G02F 1/133602* (2013.01); *G02F 1/133314* (2021.01)

(58) Field of Classification Search
CPC ......... G02F 1/133602; G02F 1/133314; G02F 1/133317; G02B 6/00
See application file for complete search history.

(56) References Cited

U.S. PATENT DOCUMENTS 10,551,548 B2 * 2/2020 Lee ...................... G02B 6/0055
10,809,554 B2 * 10/2020 Park ..................... G02B 6/0085
(Continued)

FOREIGN PATENT DOCUMENTS

| CN | 105044984 A | 11/2015 |
|----|-------------|---------|
| CN | 206040121 U | 3/2017 |

(Continued)

*Primary Examiner* — Jeff Piziali
(74) *Attorney, Agent, or Firm* — IPro, PLLC

(57) ABSTRACT

A display module includes a display panel, a middle frame, a film assembly, a backlight source and a backplane. The middle frame includes sub-frames each including a body and a support portion. The backplane includes a substrate and flanges. The sub-frames include at least one first sub-frame. The body of the first sub-frame is provided with a protrusion and the protrusion abuts against a corresponding flange. In the thickness direction of the flange, the orthographic projection of the protrusion on the substrate does not completely cover the orthographic projection of the corresponding flange on the substrate. The backlight source and the film assembly are sequentially arranged on the substrate, and the film assembly is located between the support portions and the flanges; and in the thickness direction of the flanges, an expansion gap is reserved between the protrusions and the film assembly.

20 Claims, 3 Drawing Sheets

(56) References Cited

U.S. PATENT DOCUMENTS

| | | | |
|---|---|---|---|
| 10,852,581 B2* | 12/2020 | Lee | G02F 1/133617 |
| 2012/0257136 A1* | 10/2012 | Horiuchi | G02F 1/133308 |
| | | | 362/613 |
| 2015/0029756 A1 | 1/2015 | Tanaka et al. | |
| 2015/0192824 A1* | 7/2015 | Hirota | G02B 6/0088 |
| | | | 348/725 |
| 2016/0033715 A1* | 2/2016 | Lee | G02B 6/0073 |
| | | | 257/89 |
| 2016/0223739 A1* | 8/2016 | Yoon | G02B 6/009 |
| 2017/0192164 A1 | 7/2017 | Fan | |

FOREIGN PATENT DOCUMENTS

| | | |
|---|---|---|
| CN | 110174800 A | 8/2019 |
| CN | 110361880 A | 10/2019 |
| CN | 111650685 A | 9/2020 |
| CN | 112987402 A | 6/2021 |
| WO | 2013115135 A1 | 8/2013 |

\* cited by examiner

DISPLAY MODULE AND VEHICLE-MOUNTED DISPLAY MODULE

CROSS REFERENCE TO RELATED APPLICATIONS

The present application is a national phase entry under 35 U.S.C. § 371 of International Application No. PCT/CN2021/115918, filed on Sep. 1, 2021, which claims priority to the Chinese Patent Application No. 202022392931.4, filed with the China National Intellectual Property Administration on Oct. 22, 2020 and entitled "DISPLAY MODULE AND VEHICLE-MOUNTED DISPLAY MODULE", the entire contents of which are incorporated herein by reference.

FIELD

The present disclosure relates to the technical field of display, in particular to a display module and a vehicle-mounted display module.

BACKGROUND

In recent years, application of a vehicle-mounted display module is increasingly popular. With development of technologies and a higher requirement of consumers for appearance of the display module, a display module with an ultra-narrow bezel becomes a development trend.

As shown in FIG. 1, in the prior art, a display module generally includes a middle frame 2, a backplane 3, a backlight source and a film assembly 6. The middle frame 2 includes a frame body and a support portion 21 formed on the frame body and configured to support a display panel 8. The backplane 3 includes a substrate sealing an opening of a bottom end of the middle frame 2 and a flange 33 formed at an edge of the substrate and located on an inner side of the middle frame. The flange 33 abuts against the support portion 21. An expansion gap is reserved between the film assembly 6 and the flange 33 of the backplane 3. The thickness of the flange 33 of the backplane 3 and the like need to meet a certain requirement, so under existing conditions, a width of a bezel of the display module cannot be further reduced.

SUMMARY

A display module includes: a display panel, a middle frame, a film assembly, a backlight source and a backplane. The backplane seals an opening of a bottom of the middle frame. Both the film assembly and the backlight source are arranged in a containing cavity defined by the middle frame and the backplane.

The middle frame includes a plurality of sub-frames connected in sequence end to end. Each of the sub-frames includes a body and a support portion arranged on the body. The support portion extends into the containing cavity to form a T-shaped structure with the body. The support portion has a support surface used for supporting the display panel. The display panel is arranged on the support surface.

The backplane includes a substrate sealing the opening of the bottom of the middle frame and flanges formed at an edge of the substrate and located on an inner side of the middle frame, and the flanges correspond to the sub-frames one to one.

The plurality of sub-frames of the middle frame include at least one first sub-frame. A protrusion extending into the containing cavity is formed on a portion of a body of each of the at least one first sub-frame facing away from the support surface. A surface of the protrusion facing away from the support portion abuts against a surface of the corresponding flange facing the support portion. In a thickness direction of the flange, an orthographic projection of the protrusion on the substrate does not completely cover an orthographic projection of the corresponding flange on the substrate.

The backlight source and the film assembly are sequentially arranged on the substrate. In the thickness direction of the flange, an expansion gap is reserved between the protrusion and the film assembly.

In the display module provided by the present disclosure, the protrusion extending into the containing cavity is disposed on a portion of the body of the first sub-frame of the middle frame facing away from the support surface, so the flange of the backplane with a limited thickness and the film assembly are staggered, the protrusion and the film assembly are opposite, and the expansion gap between the protrusion and the film assembly is reserved. Therefore an expansion-limited boundary is transferred from an inner side of the flanges onto the protrusions of the first sub-frames. In the thickness direction of the flanges, an orthographic projection of each of the protrusions on the substrate does not completely cover an orthographic projection of the corresponding flange on the substrate, so in a case of no change of other conditions, a distance between a body of each of the sub-frames provided with the protrusion and the film assembly is reduced, a total width of a corresponding bezel of the display module is further reduced compared with the prior art, an demand of people for a display module with a ultra-narrow bezel can be further met. Moreover, mass producibility is achieved, and product competitiveness can be improved.

Besides, in the above display module provided by the embodiments, the surface of the protrusion facing away from the support portion abuts against the surface of the corresponding flange facing the support portion, it helps to guarantee that a function issue will not occur to a vibration drop test and a reliability test, and thus mass producibility is higher.

Optionally, a size of an overlap region of the orthographic projection of the protrusion on the substrate and the orthographic projection of the corresponding flange on the substrate in the thickness direction of the flange is greater than or equal to 0.3 mm.

Optionally, under the condition that a length of a diagonal line of an effective display region of the display module is within 15 inches, a thickness value of each of the flanges is between 0.8 mm and 1.2 mm, and a size of each of the protrusions in a direction facing away from the body of the corresponding sub-frame is greater than or equal to 0.5 mm.

Optionally, as for the first sub-frame, in a thickness direction of the film assembly, the film assembly is located between the support portion and the flange, and a gap exists between a surface of the film assembly facing away from the support portion and the surface of the flange facing the support portion.

Optionally, the plurality of sub-frames of the middle frame include at least one second sub-frame, and the second sub-frame is not provided with a protrusion. A surface of a support portion of each of the second sub-frames facing away from the support surface abuts against the surface of the corresponding flange facing the support portion, and in the thickness direction of the flange, an expansion gap is reserved between the flange and the film assembly.

Optionally, the backlight source includes a light guide plate and a light bar arranged on a light inlet side of the light guide plat. The sub-frame closest to the light bar and extending in a length direction of the light bar among the plurality of sub-frames is the second sub-frame.

Optionally, the middle frame includes four sub-frames connected end to end in sequence. The sub-frame corresponding to a bottom edge of the display panel is a bottom frame, and two sub-frames adjacent to the bottom frame in the middle frame are the first sub-frames.

Optionally, the middle frame includes four sub-frames connected end to end in sequence. The sub-frame corresponding to a bottom edge of the display panel is a bottom frame, and the three sub-frames in the middle frame except the bottom frame are the first sub-frames.

Optionally, the middle frame is a rectangular frame, a length direction of the film assembly is parallel to a length direction of the bottom frame, and a width direction of the film assembly is perpendicular to the length direction of the bottom frame.

A value of the expansion gap between the protrusions of the two first sub-frames adjacent to the bottom frame and the film assembly is greater than or equal to 0.002 times the length of the film assembly at a normal temperature, and a value of the expansion gap between the protrusion of the first sub-frame opposite to the bottom frame and the film assembly is greater than or equal to 0.004 times the width of the film assembly at the normal temperature.

Optionally, a distance between the support portion and the effective display region of the display module is greater than or equal to 0.8 mm.

Under the condition that the length of the diagonal line of the effective display region of the display module is smaller than or equal to 12.3 inches, a size of an orthographic projection of the support portion on the film assembly at the normal temperature in the thickness direction of the flange is greater than or equal to 1.2 mm. Under the condition that the length of the diagonal line of the effective display region of the display module is greater than 12.3 inches, the size of the orthographic projection of the support portion on the film assembly at the normal temperature in the thickness direction of the flange is greater than or equal to 1.5 mm.

Optionally, a cell tape is included, the cell tape wraps an outer surface of the middle frame and adheres to an edge of the display panel, and a thickness value of the cell tape is between 0.05 mm and 0.1 mm.

A thickness value of the body is between 0.7 mm and 1.2 mm.

Optionally, a gap between the body and the corresponding flange is 0.1 mm.

Optionally, the length of the diagonal line of the effective display region of the display module is 10.25 inches, a size of the protrusion in the direction facing away from the body of the correspond sub-frame is 0.55 mm, a size of the protrusion in a direction perpendicular to the support portion is 1.16 mm, a thickness of the flange is 0.8 mm, the distance between the support portion and the effective display region of the display module is 0.8 mm, a size of an orthographic projection of the support portion on the film assembly at the normal temperature in the thickness direction of the flange is 1.34 mm, the expansion gap between the protrusions of the two first sub-frames adjacent to the bottom frame and the film assembly is 0.55 mm, and a thickness of the cell tape 1 is 0.06 mm.

Optionally, the length of the diagonal line of the effective display region of the display module is 12.3 inches, the size of the protrusion in the direction facing away from the body of the corresponding sub-frame is 0.57 mm, the size of the protrusion in the direction perpendicular to the support portion is 1.2 mm, the thickness of the flange is 0.8 mm, the distance between the support portion and the effective display region of the display module is 0.8 mm, the size of the orthographic projection of the support portion on the film assembly at the normal temperature in the thickness direction of the flange is 1.25 mm, the expansion gap between the protrusions of the two first sub-frames adjacent to the bottom frame and the film assembly is 0.68 mm, and the thickness of the cell tape is 0.06 mm.

The vehicle-mounted display module provided by the present disclosure includes any display module provided in the above technical solution, such that at least technical effects which the above display module can realize can be achieved, that is, the distance between the body of the sub-frame provided with the protrusion and the film assembly is reduced, a total width of the corresponding bezel of the display module is further reduced compared with the prior art, the demand of people for the display module with the ultra-narrow bezel can be further met, and moreover, mass producibility is achieved, and product competitiveness can be improved.

Reference numbers: 1-cell tape; 2-middle frame; 21-support portion; 22-protrusion; 3-backplane; 33-flange; 4-backlight source; 5-light guide plate; 6-film assembly; 7-foam tape; 8-display panel; and 9-light bar.

DETAILED DESCRIPTION OF THE EMBODIMENTS

The technical solutions in the embodiments of the present disclosure will be described clearly and completely below with reference to the accompanying drawings in the embodiments of the present disclosure. Apparently, the described embodiments are only some but not all of the embodiments of the present disclosure. Based on the embodiments in the present disclosure, all other embodiments obtained by those ordinarily skilled in the art without creative work fall within a protection range of the present disclosure.

Figure 2:
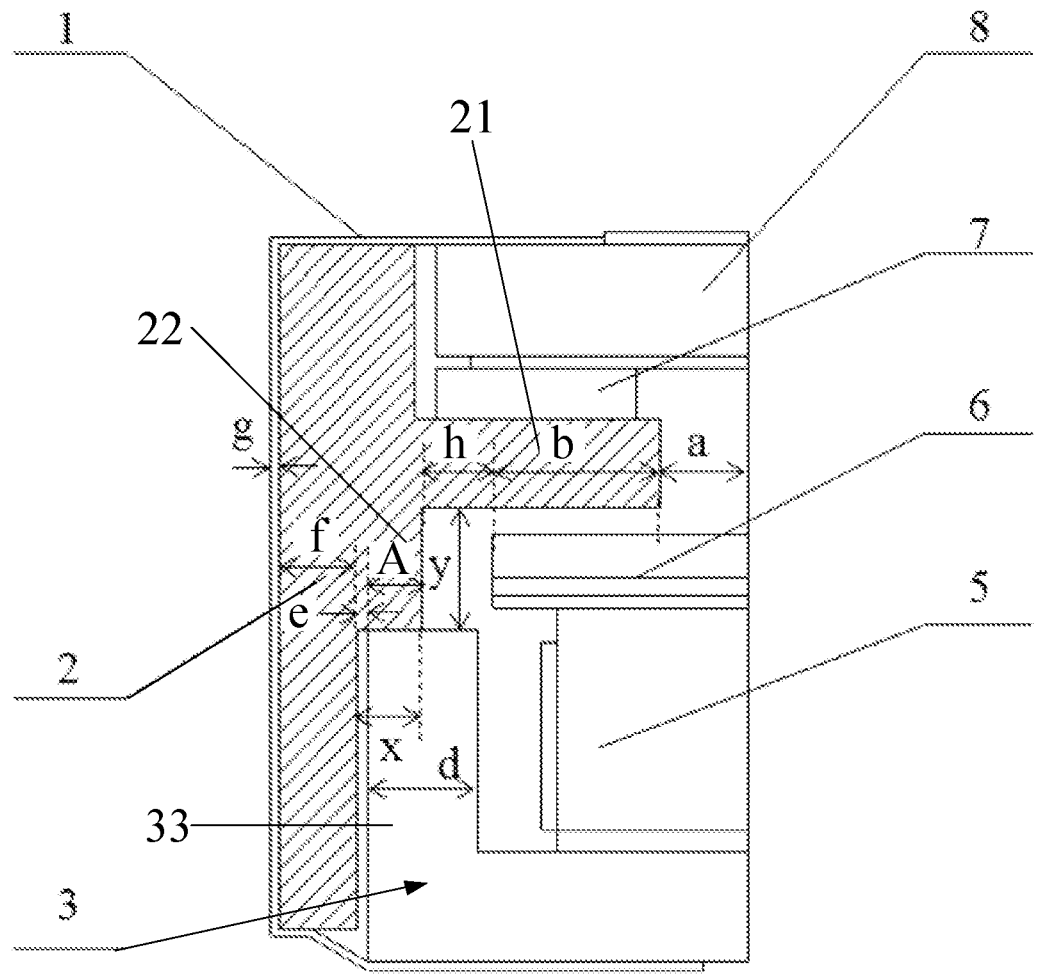
FIG. 2 is a cross-sectional diagram of a sub-frame provided with a protrusion in a display module provided by an embodiment of the present disclosure.
Figure 3:
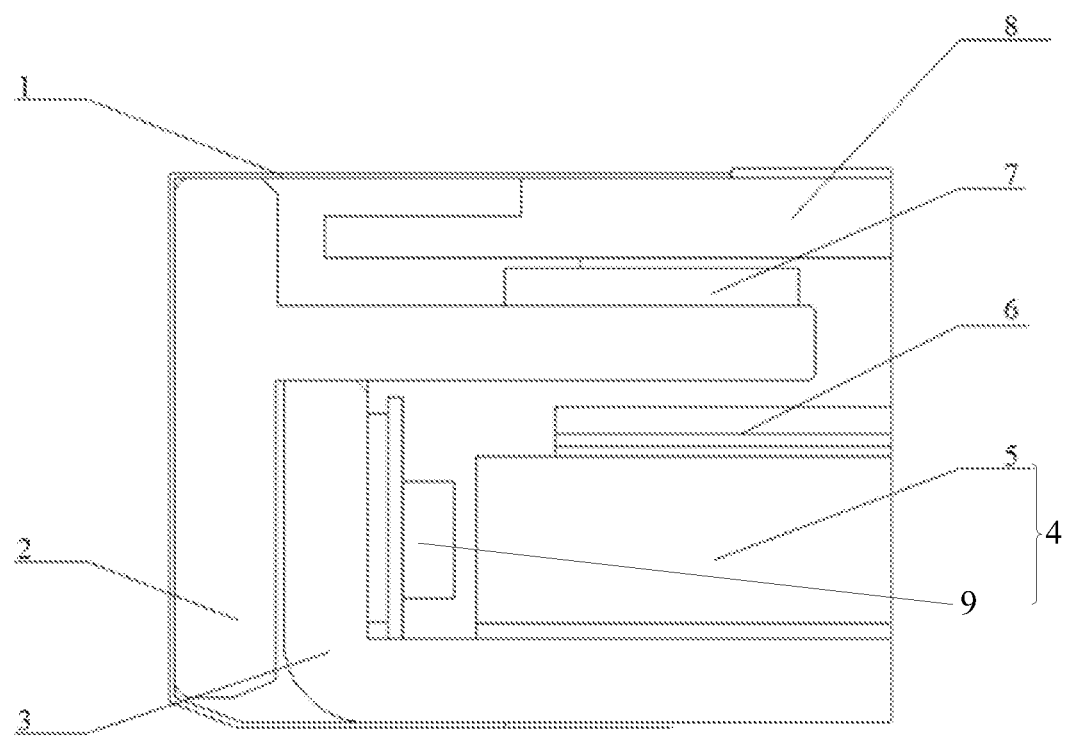
FIG. 3 is a cross-sectional diagram of a first sub-frame in a display module provided by an embodiment of the present disclosure.

As shown in FIG. 2 and FIG. 3, the display module provided by an embodiment includes a display panel 8, a middle frame 2, a film assembly 6, a backlight source 4 and a backplane 3. The backplane 3 seals an opening of a bottom of the middle frame 2, and both the film assembly 6 and the backlight source 4 are arranged in a containing cavity defined by the middle frame 2 and the backplane 3.

The middle frame 2 includes a plurality of sub-frames connected in sequence end to end. Each sub-frame includes a body and a support portion 21 arranged on the body. The support portion 21 extends into the containing cavity to form a T-shaped structure with the body. The support portion 21 has a support surface used for supporting the display panel 8, and the display panel 8 is arranged on the support surfaces.

The backplane 3 includes a substrate sealing the opening of the bottom of the middle frame 2 and flanges 33 formed at an edge of the substrate and located on an inner side of the middle frame 2, and the flanges 33 correspond to the sub-frames one to one.

The plurality of sub-frames of the middle frame 2 include at least one first sub-frame, a protrusion 22 extending into the containing cavity is formed on a portion of a body of each of the first sub-frames facing away from the support surface, a surface of the protrusion 22 facing away from the support portion 21 abuts against a surface of the corresponding flange 33 facing the support portion 21, and in a thickness direction of the flange 33, an orthographic projection of the protrusion 22 on the substrate does not completely cover an orthographic projection of the corresponding flange 33 on the substrate.

The backlight source 4 and the film assembly 6 are sequentially arranged on the substrate, and in the thickness direction of the flange 33, an expansion gap is reserved between the protrusion 22 and the film assembly 6.

In the display module provided by the embodiments, the protrusion 22 extending into the containing cavity is disposed on a portion of the body of the first sub-frame of the middle frame facing away from the support surface, so the flanges 33 of the backplane 3 with a limited thickness and the film assembly 6 are staggered, the protrusion 22 and the film assembly 6 are made face to face, and the expansion gap between the protrusion and the film assembly 6 is reserved. Therefore an expansion-limited boundary is transferred from an inner side of the flanges 33 onto the protrusions 22 of the first sub-frames. In the thickness direction of the flanges 33, an orthographic projection of each of the protrusions 22 on the substrate does not completely cover an orthographic projection of the corresponding flange 33 on the substrate, so in a case of no change of other conditions, a distance between a body of each of the sub-frames provided with the protrusion 22 and the film assembly 6 is reduced, a total width of a corresponding bezel of the display module is further reduced compared with the prior art, an demand of people for a display module with a ultra-narrow bezel can be further met, moreover, mass producibility is achieved, and product competitiveness can be improved.

Besides, in the above display module provided by the embodiments, the surface of the protrusion 22 facing away from the support portion 21 abuts against the surface of the corresponding flange 33 facing the support portion 21, it helps to guarantee that a function issue will not occur to a vibration drop test and a reliability test, and thus mass producibility is higher.

When the above display panel 8 is arranged, the display panel 8 may be glued to the support surface of the support portion 21 through the foam tape 7.

Optionally, the plurality of sub-frames of the middle frame 2 include at least one second sub-frame, and the second sub-frame is not provided with a protrusion 22. A surface of a support portion 21 of each of the second sub-frames facing away from the support surface abuts against the surface of the corresponding flange 33 facing the support portion 21, and in the thickness direction of the flange 33, an expansion gap is reserved between the flange 33 and the film assembly 6.

In an implementation, the backlight source 4 includes a light guide plate 5 and a light bar 9 arranged on a light inlet side of the light guide plate 5. The sub-frame closest to the light bar 9 and extending in a length direction of the light bar 9 among the plurality of sub-frames is the second sub-frame.

When the above protrusion 22 is arranged, in order to guarantee that the protrusion 22 and the corresponding flange 33 have enough contact area, in an optional technical solution, a size (namely A in the figure) of an overlap region of an orthographic projection of the protrusion 22 on the substrate and an orthographic projection of the corresponding flange 33 on the substrate in the thickness direction of the flange 33 is greater than or equal to 0.3 mm, optionally, $A \geq 0.4$ mm.

Under the condition that a length of a diagonal line of an effective display region of the display module is within 15 inches, a thickness (namely, d in the figure) of the flange 33 may be between 0.8 mm and 1.2 mm, and a size (namely x in the figure) of the protrusion 22 in a direction facing away from the body of the corresponding sub-frame is greater than or equal to 0.5 mm.

Optionally, under the condition that the length of the diagonal line of the effective display region of the display module is within 10 inches, d may be selected as 0.8 mm. Under the condition that the length of the diagonal line of the effective display region of the display module is between 10 inches and 13 inches, d may be selected as 0.8 mm to 1 mm, and under the condition that the length of the diagonal line of the effective display region of the display module is above 15 inches, d may be selected as 1.2 mm.

Optionally, as for the first sub-frame, in a thickness direction of the film assembly 6, the film assembly 6 is located between the support portion 21 and the flange 33, and a gap exists between a surface of the film assembly 6 facing away from the support portion 21 and the surface of the flange 33 facing the support portion 21.

The display module mentioned in the embodiments may be a quadrangular display module or a special-shaped display module. Taking the display module being a quadrangular display module as an example, in general, a horizontal size is large, so a left side and a right side are more hardly designed to be a narrow bezel. In an implementation of the embodiments, the middle frame 2 includes four sub-frames connected in sequence end to end. The sub-frame corresponding to a bottom edge of the display panel 8 is a bottom frame, and the two sub-frames adjacent to the bottom frame in the middle frame 2 are the first sub-frames.

In another implementation, the middle frame 2 includes four sub-frames connected in sequence end to end, the sub-frame corresponding to the bottom edge of the display panel 8 is 0.7 the bottom frame, and the three sub-frames in the middle frame 2 except the bottom frame are the first sub-frames.

In other implementations, under the condition that the middle frame 2 includes the four sub-frames connected end to end in sequence, the quantity of the first sub-frames among the four sub-frames may be also one or four. Under the condition that the four sub-frames of the middle frame 2 are each provided with the protrusion 22, optionally, the structure may be applied to, for example, a straight down type backlight module.

The expansion gap (namely h in the figure) reserved between the protrusion 22 and the film assembly 6 is to guarantee that the film assembly 6 has enough expansion space at a high temperature. Taking the middle frame being a rectangular frame, the three sub-frames in the middle frame 2 except the bottom frame being the first sub-frames, a length direction of the film assembly being parallel to a length direction of the bottom frame, and a width direction of the film assembly being perpendicular to the length direction of the bottom frame as an example, an expansion direction of the film assembly is usually set to be: long edges are for symmetrical expansion in a left direction and a right direction, short edges are for upward expansion in a single direction, such that the corresponding expansion gap between the film assembly and the right and left first sub-frames is greater than or equal to total length L of a film x expansion coefficient/2, and the expansion gap between the film assembly and the first sub-frame opposite to the bottom frame is greater than total width W of the film x expansion coefficient. The expansion coefficient of the film is usually selected as 0.4%, and LGP expansion coefficient is usually selected as 0.3%.

That is, a value of the expansion gap between the protrusions of the two first sub-frames adjacent to the bottom frame and the film assembly is greater than or equal to 0.002 times the length of the film assembly at a normal temperature, and a value of the expansion gap between the protrusion of the first sub-frame opposite to the bottom frame and the film assembly is greater than or equal to 0.004 times the width of the film assembly at the normal temperature.

When the above support portion 21 is arranged, in order to guarantee that a user cannot see the support portion 21, the distance (namely, a in the figure) between the support portion 21 and the effective display region of the display module is greater than or equal to 0.8 mm.

When the above film assembly 6 is arranged, in order to guarantee that the film assembly 6 does not skip to outside of the middle frame 2 after shrinking to avoid a risk of light leakage, in the embodiments, under the condition that the length of the diagonal line of the effective display region of the display module is smaller than or equal to 12.3 inches, a size (namely, b in the figure) of an orthographic projection of the support portion 21 on the film assembly 6 at the normal temperature in the thickness direction of the flange 33 may be greater than or equal to 1.2 mm; and under the condition that the length of the diagonal line of the effective display region of the display module is greater than 12.3 inches, the size of the orthographic projection of the support portion 21 on the film assembly 6 at the normal temperature in the thickness direction of the flange 33 may be greater than or equal to 1.5 mm.

In an implementation, the display module includes a cell tape 1. The cell tape 1 wraps an outer surface of the middle frame 2 and adheres to an edge of the display panel 8, and a thickness value (namely g in the figure) of the cell tape 1 is between 0.05 mm and 0.1 mm, and a thickness value (namely f in the figure) of the body of the sub-frame is between 0.7 mm and 1.2 mm, for example: f=1 mm. A gap (namely e in the figure) between the body and the corresponding flange 33 is 0.1 mm.

The display module mentioned in the embodiments may be a liquid crystal display module.

A limited width of a bezel of the display module provided by the embodiments is compared below with a limited width of a bezel of the display module in the prior art by giving an example.

Figure 1:
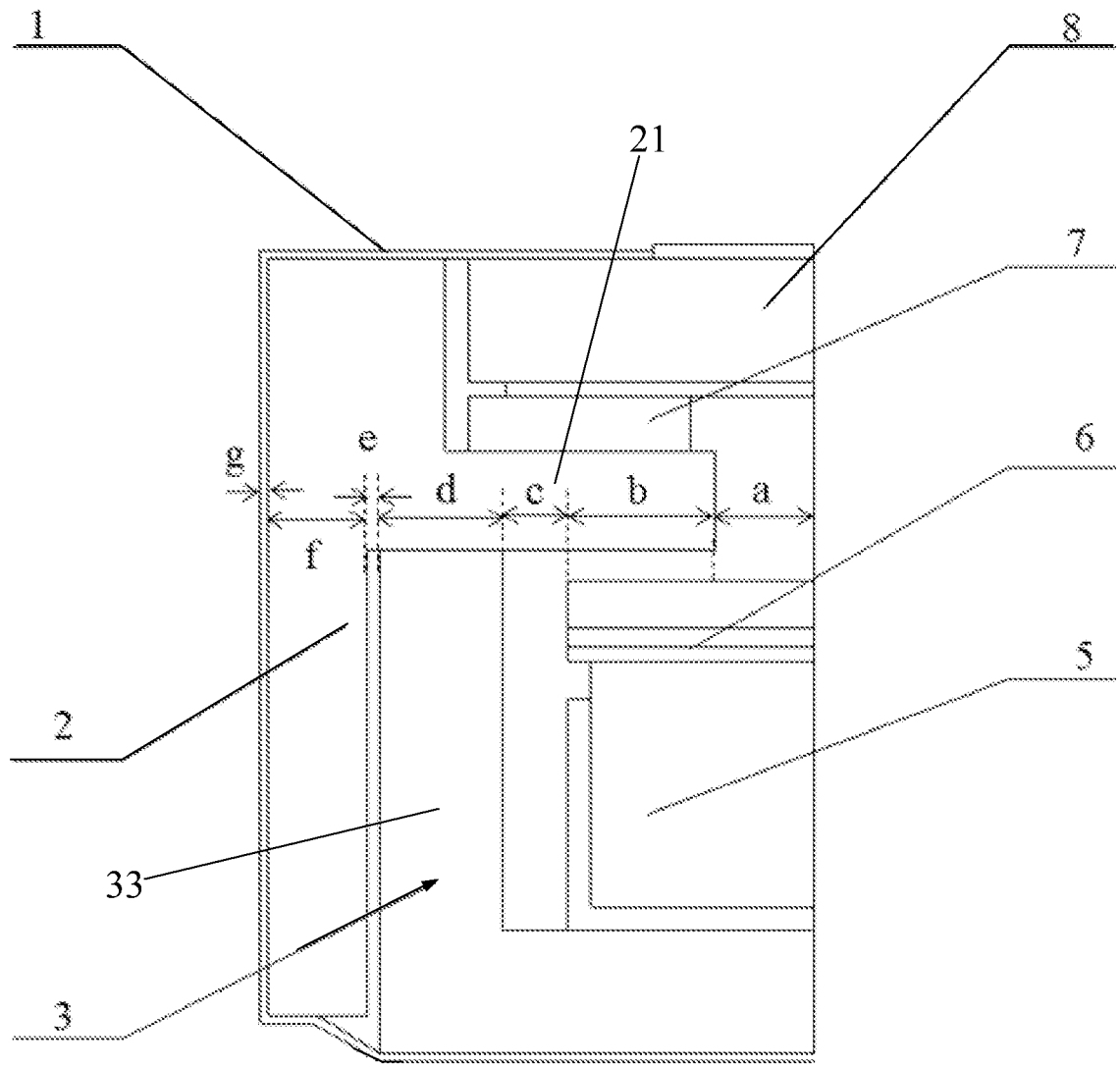
FIG. 1 is a cross-sectional diagram of a bezel of a display module in the prior art.

As shown in FIG. 1, a limited bezel width of the display module (MDL for short) in the prior art is a+b+c+d+e+f+g, what are represented by a, b, d, e, f and g may refer to the embodiments, c is a distance between an inner surface of the flange and the film assembly. If a takes 0.8, e takes 0.1, f takes 0.7, g takes 0.06, then a left and right frame limited width of MDL is 0.8+b+(L×0.004/2)+d+0.1+0.7+0.06; and an upper frame limited width of MDL is 0.8+b+(W×0.004)+d+0.1+0.7+0.06.

If the length of the diagonal line of the effective display region of the display module is 10.25 inches, b is 1.2 mm, the length L of the film is 250 mm, a width w of the film is 100 mm, a value d is 0.8 mm, the left and right frame limited width of the display module is 4.16 mm, and the upper frame limited width is 4.06 mm.

If the length of the diagonal line of the effective display region of the display module is 12.3 inches, b is 1.2 mm, the length L of the film is 300 mm, the width W of the film is 120 mm, the value d is 0.8 mm, the left and right frame limited width of the display module is 4.26 mm, and the upper frame limited width is 4.14 mm.

In the display module provided by the embodiments, the gap c between the flange 33 and the film assembly 6 is h+x−e−d=h+x−0.1−d mm, which is substituted into the above formula so that the left and right frame limited width of the display module is a+b+c+d+e+f+g=a+b+0.002L+x−d−0.1+d+0.1+f+0.06=a+b+0.002L+x+f+0.06 mm. The upper frame limited width is a+b+0.004W+x+f+0.06 mm.

If the length of the diagonal line of the effective display region of the display module is 10.25 inches, the thickness of the backplane 3 is 0.8 mm, a width x of a step is designed to be 0.5 mm, the left and right frame limited width of the display module is a+b+0.002L+x+f+0.06 mm=0.8+1.2+0.002×250+x+0.7+0.06=3.26+0.5=3.76 mm<4.16 mm, and the upper frame limited width is 3.66 mm<4.06 mm.

If the length of the diagonal line of the effective display region of the display module is 12.3 inches, the thickness of the backplane 3 is 0.8 mm, a width x of a step is designed to be 0.5 mm, the left and right frame limited width of the display module is a+b+0.002L+x+f+0.06 mm=0.8+1.2+0.002×300+x+0.7+0.06=3.86 mm<4.26 mm, and the upper frame limited width is 3.74 mm<4.14 mm.

Embodiments of two display modules being rectangular are cited below.

Embodiment 1

In a structural design of a length of a diagonal line of an effective display region of a display module being 10.25 inches, a material of a middle frame 2 is polycarbonate (PC), an injection molding process is adopted, a left frame and right frame (namely, two first sub-frames adjacent to a bottom frame) of the middle frame 2 are each provided with a protrusion 22, and the bottom frame of the middle frame 2 corresponds to a light bar 9 and is not provided with a protrusion 22. A size x of the protrusion 22 in a direction facing away from a body of a corresponding sub-frame is 0.55 mm, a height y (namely, a size of a protrusion in a direction perpendicular to a support portion) of the protrusion 22 is 1.16 mm, and it is guaranteed that a film assembly 6, after expanded, does not interfere with flanges 33 of a backplane 3.

A material of the backplane 3 is aluminum or other common metal materials, a thickness of each of the flanges 33 of the backplane 3 is designed to be 0.8 mm, a height of the flanges 33 on the left side and the right side of the backplane 3 is 1.16 mm smaller than a height of the flange 33 on a side of the light bar 9, and thus it is guaranteed that a film, after expanded, does not interfere with the backplane 3.

Furthermore, a is set to be 0.8 mm (≥0.8 mm), b is set to be 1.34 mm (>1.2 mm, the greater the value is, the smaller the risk of skipping of the film assembly 6 and occurring of a bright line on a side becomes), an expansion gap h between the protrusions of left and right sub-frames of the middle frame and the film assembly 6 is set to be 0.55 mm (>0.002L=0.5 mm), a thickness of a cell tape 1 (Cell tape) is set to be 0.06 mm, and it can be obtained through calculation that a left and right frame width of the display module is 0.8+1.34+0.55+0.55+0.7+0.06=4.0 mm.

Embodiment 2

In a structural design of a length of a diagonal line of an effective display region of a display module being 12.3 inches, a frame width of the module is ≤4.06 mm, specifically, a material of a middle frame 2 is PC, a left sub-frame and a right sub-frame of the middle frame 2 are each provided with a protrusion 22, a bottom frame of the middle frame 2 corresponds to a light bar 9 and is not provided with a protrusion 22, a size x of the protrusion 22 in a direction facing away from a body of a corresponding sub-frame is 0.57 mm (≥0.5 mm, which meets a requirement), a height y of the protrusion 22 is 1.2 mm, and it is guaranteed that the film assembly 6, after expanded, does not interfere with flanges 33 of the backplane 3.

A material of the backplane 3 is aluminum, a thickness of each of the flanges 33 of the backplane 3 is designed to be 0.8 mm, a height of the flanges 33 on the left side and the right side of the backplane 3 is 1.2 mm smaller than a height of the flange 33 on a side of the light bar 9, and thus it is guaranteed that the film assembly 6, after expanded, does not interfere with the backplane 3.

Furthermore, a is set to be 0.8 mm, b is set to be 1.25 mm (>1.2 mm), an expansion gap h between protrusions of a left sub-frame and a right sub-frame of the middle frame and the film assembly 6 is set to be 0.68 mm (>0.002L=0.6 mm), a thickness of a cell tape 1 is set to be 0.06 mm, and it can be obtained from calculation that a left and right frame width of the display module is 0.8+1.25+0.68+0.57+0.7+0.06=4.06 mm.

The vehicle-mounted display module provided by the embodiments includes any display module provided in the above technical solution, such that at least technical effects which the above display module can realize can be achieved, that is, the distance between the body of the sub-frame provided with the protrusion and the film assembly is reduced, a total width of the corresponding bezel of the display module is further reduced compared with the prior art, the demand of people for the display module with the ultra-narrow bezel can be further met, and moreover, mass producibility is achieved, and product competitiveness can be improved.

Apparently, those skilled in the art can make various modifications and transformations to the present disclosure without departing from the spirit and scope of the present disclosure. In this case, if these modifications and transformations of the present disclosure fall within the scope of the claims and their equivalents of the present disclosure, the present disclosure also intends to contain these modifications and transformations.

What is claimed is:

1. A display module, comprising:
a display panel,
a middle frame,
a film assembly,
a backlight source, and
a backplane,
wherein the backplane seals an opening of a bottom of the middle frame;
both the film assembly and the backlight source are arranged in a containing cavity defined by the middle frame and the backplane;
the middle frame comprises:
a plurality of sub-frames connected in sequence end to end;
wherein each of the sub-frames comprises:
a body; and
a support portion arranged on the body;
wherein the support portion extends into the containing cavity to form a T-shaped structure with the body;
the support portion is provided with a support surface used for supporting the display panel; and
the display panel is arranged on the support surface;
the backplane comprises:
a substrate sealing the opening of the bottom of the middle frame; and
flanges formed at an edge of the substrate and located on an inner side of the middle frame;
wherein the flanges correspond to the sub-frames one to one;
the plurality of sub-frames of the middle frame comprise:
at least one first sub-frame;
wherein a protrusion extending into the containing cavity is formed on a portion of the body of each of the at least one first sub-frame facing away from the support surface;
a surface of the protrusion facing away from the support portion abuts against a surface of the corresponding flange facing the support portion; and
in a thickness direction of the flange, an orthographic projection of the protrusion on the substrate does not completely cover an orthographic projection of the corresponding flange on the substrate; and
the backlight source and the film assembly are sequentially arranged on the substrate; and
in the thickness direction of the flange, an expansion gap is reserved between the protrusion and the film assembly.

2. The display module according to claim 1, wherein a size of an overlap region of the orthographic projection of the protrusion on the substrate and the orthographic projection of the corresponding flange on the substrate in the thickness direction of the flange is greater than or equal to 0.3 mm.

3. The display module according to claim 2, wherein under a condition that a length of a diagonal line of an effective display region of the display module is within 15 inches, a thickness value of the flange is between 0.8 mm and 1.2 mm, and a size of the protrusion in a direction facing away from the body of the corresponding sub-frame is greater than or equal to 0.5 mm.

4. The display module according to claim 1, wherein as for the first sub-frame, in a thickness direction of the film assembly, the film assembly is located between the support portion and the flange, and a gap exists between a surface of the film assembly facing away from the support portion and the surface of the flange facing the support portion.

5. The display module according to claim 1, wherein the plurality of sub-frames of the middle frame comprise:
at least one second sub-frame;
wherein the second sub-frame is not provided with the protrusion;
a surface of a support portion of each of the at least one second sub-frame facing away from the support surface abuts against a surface of the corresponding flange facing the support portion; and
in the thickness direction of the flange, an expansion gap is reserved between the flange and the film assembly.

6. The display module according to claim 5, wherein the backlight source comprises:

a light guide plate; and
a light bar arranged on a light inlet side of the light guide plate;
wherein a sub-frame closest to the light bar and extending in a length direction of the light bar among the plurality of sub-frames is the second sub-frame.

7. The display module according to claim 1, wherein the middle frame comprises:
four sub-frames connected end to end in sequence;
wherein the sub-frame corresponding to a bottom edge of the display panel is a bottom frame; and
two sub-frames adjacent to the bottom frame in the middle frame are the first sub-frames.

8. The display module according to claim 1, wherein the middle frame comprises:
four sub-frames connected end to end in sequence;
wherein the sub-frame corresponding to a bottom edge of the display panel is a bottom frame; and
the three sub-frames in the middle frame except the bottom frame are the first sub-frames.

9. The display module according to claim 8, wherein the middle frame is a rectangular frame, a length direction of the film assembly is parallel to a length direction of the bottom frame, and a width direction of the film assembly is perpendicular to the length direction of the bottom frame; and
a value of the expansion gap between the protrusions of the two first sub-frames adjacent to the bottom frame and the film assembly is greater than or equal to 0.002 times the length of the film assembly at a normal temperature, and a value of the expansion gap between the protrusion of the first sub-frame opposite to the bottom frame and the film assembly is greater than or equal to 0.004 times the width of the film assembly at the normal temperature.

10. The display module according to claim 7, wherein a distance between the support portion and an effective display region of the display module is greater than or equal to 0.8 mm;
under a condition that a length of a diagonal line of the effective display region of the display module is smaller than or equal to 12.3 inches, a size of an orthographic projection of the support portion on the film assembly at the normal temperature in the thickness direction of the flange is greater than or equal to 1.2 mm; and under a condition that the length of the diagonal line of the effective display region of the display module is greater than 12.3 inches, the size of the orthographic projection of the support portion on the film assembly at the normal temperature in the thickness direction of the flange is greater than or equal to 1.5 mm.

11. The display module according to claim 10, further comprising:
a cell tape;
wherein the cell tape wraps an outer surface of the middle frame and adheres to an edge of the display panel;
a thickness value of the cell tape is between 0.05 mm and 0.1 mm; and
a thickness value of the body is between 0.7 mm and 1.2 mm.

12. The display module according to claim 10, wherein a gap between the body and the corresponding flange is 0.1 mm.

13. The display module according to claim 11, wherein the length of the diagonal line of the effective display region of the display module is 10.25 inches, a size of the protrusion in the direction facing away from the body of the corresponding sub-frame is 0.55 mm, a size of the protrusion in a direction perpendicular to the support portion is 1.16 mm, a thickness of the flange is 0.8 mm, the distance between the support portion and the effective display region of the display module is 0.8 mm, a size of an orthographic projection of the support portion on the film assembly at the normal temperature in the thickness direction of the flange is 1.34 mm, the expansion gap between the protrusions of the two first sub-frames adjacent to the bottom frame and the film assembly is 0.55 mm, and a thickness of the cell tape is 0.06 mm.

14. The display module according to claim 11, wherein the length of the diagonal line of the effective display region of the display module is 12.3 inches, a size of the protrusion in the direction facing away from the body of the corresponding sub-frame is 0.57 mm, a size of the protrusion in a direction perpendicular to the support portion is 1.2 mm, a thickness of the flange is 0.8 mm, the distance between the support portion and the effective display region of the display module is 0.8 mm, a size of the orthographic projection of the support portion on the film assembly at the normal temperature in the thickness direction of the flange is 1.25 mm, the expansion gap between the protrusions of the two first sub-frames adjacent to the bottom frame and the film assembly is 0.68 mm, and a thickness of the cell tape is 0.06 mm.

15. A vehicle-mounted display module, comprising the display module according to claim 1.

16. The display module according to claim 8, wherein a distance between the support portion and an effective display region of the display module is greater than or equal to 0.8 mm;
under a condition that a length of a diagonal line of the effective display region of the display module is equal to 12.3 inches, a size of an orthographic projection of the support portion on the film assembly at the normal temperature in the thickness direction of the flange is greater than or equal to 1.2 mm.

17. The display module according to claim 16, further comprising:
a cell tape;
wherein the cell tape wraps an outer surface of the middle frame and adheres to an edge of the display panel;
a thickness value of the cell tape is between 0.05 mm and 0.1 mm; and
a thickness value of the body is between 0.7 mm and 1.2 mm.

18. The display module according to claim 16, wherein a gap between the body and the corresponding flange is 0.1 mm.

19. The display module according to claim 17, wherein the length of the diagonal line of the effective display region of the display module is 10.25 inches, a size of the protrusion in the direction facing away from the body of the corresponding sub-frame is 0.55 mm, a size of the protrusion in a direction perpendicular to the support portion is 1.16 mm, a thickness of the flange is 0.8 mm, the distance between the support portion and the effective display region of the display module is 0.8 mm, a size of an orthographic projection of the support portion on the film assembly at the normal temperature in the thickness direction of the flange is 1.34 mm, the expansion gap between the protrusions of the two first sub-frames adjacent to the bottom frame and the film assembly is 0.55 mm, and a thickness of the cell tape is 0.06 mm.

20. The display module according to claim 17, wherein the length of the diagonal line of the effective display region of the display module is 12.3 inches, a size of the protrusion in the direction facing away from the body of the corresponding sub-frame is 0.57 mm, a size of the protrusion in a direction perpendicular to the support portion is 1.2 mm, a thickness of the flange is 0.8 mm, the distance between the support portion and the effective display region of the display module is 0.8 mm, a size of the orthographic projection of the support portion on the film assembly at the normal temperature in the thickness direction of the flange is 1.25 mm, the expansion gap between the protrusions of the two first sub-frames adjacent to the bottom frame and the film assembly is 0.68 mm, and a thickness of the cell tape is 0.06 mm.

* * * * *